April 9, 1957  H. E. KENNEDY  2,788,463
ARC ELECTRODE FEEDING CONTROL
Filed Jan. 14, 1955  2 Sheets-Sheet 1

INVENTOR
HARRY E. KENNEDY
BY
Barnwell R. King
ATTORNEY

April 9, 1957  H. E. KENNEDY  2,788,463
ARC ELECTRODE FEEDING CONTROL
Filed Jan. 14, 1955  2 Sheets-Sheet 2

INVENTOR
HARRY E. KENNEDY
BY
Barnwell R. King
ATTORNEY

United States Patent Office 2,788,463
Patented Apr. 9, 1957

2,788,463

ARC ELECTRODE FEEDING CONTROL

Harry E. Kennedy, Berkeley, Calif., assignor to Union Carbide and Carbon Corporation, a corporation of New York Application January 14, 1955, Serial No. 481,855

4 Claims. (Cl. 314—78)

This invention relates to a means for automatically regulating the rate of feeding a consumable current carrying electrode toward a welding arc zone without the usual disadvantage of overcontrol due to inertia, which is inherent in prior automatic electrode feeding control systems.

Briefly, the invention provides an arc electrode feed mechanism comprising a drive roll and an idler roll arranged to grip and feed a fusible electrode. The drive roll is driven at a substantially constant speed which is somewhat higher than that necessary to feed the electrode. The idler roll is urged away from the drive roll and electrode by a spring. The force of the spring is overcome, however, by automatic means for pressing the idler roll into engagement with the electrode which is thus pressed into engagement with and driven by the drive roll in accordance with a desired characteristic of the arc. Such means includes a novel relay comprising an input circuit that is responsive to such characteristic, and an output circuit that controls such pressure of the idler roll so that the system automatically regulates the electrode feed to keep constant the desired arc characteristic.

Arc length is a major factor influencing the electrical characteristics of an arc and the success of a welding operation. There are, in general, two systems by which the arc may be energized. The more common is called a constant current system in which the current is maintained substantially constant by the power source. In such system the voltage across the arc depends on the arc length. In the second system, known as constant potential, the voltage across the arc is maintained substantially constant by the power source.

Good arc welding requires accurate control of the electrode position, not only because of the electrical effect, but for other reasons as well. The contour of the weld bead and the time for exposure to contamination are affected by arc length. The tip of the electrode is constantly being melted away so that it is necessary to move, i. e., feed, the main body of the electrode towards the work to replace the amount consumed. This should be done with precision, especially in inert gas shielded metal arc welding.

The electrode is usually fed by means of motor driven rolls which grip the electrode to impart translatory motion to it. The action of the motor is controlled by the voltage across the arc. Variations in the arc may occur with such rapidity that the motor can not follow them because of the inertia in the system. If the arc needs shortening, relatively appreciable time elapses before the motor can accelerate to restore proper conditions. The energy then stored causes the electrode to overrun. This condition is aggravated by unevenness in the workpiece, such as tacks, or by variations in the operator's manipulations.

I have devised a novel method of and means for automatically controlling the feed of an electrode which almost eliminates the inertia effect and provides an almost instantaneously responsive action required to maintain the proper welding conditions. I use a motor driven feed roll having a smooth surface operating at such a speed as to exceed the electrode (rod) requirements. The electrode is engaged with the feed or drive roll by applying pressure to an idler roll which also has a smooth surface located opposite such feed roll. The idler roll is preferably mounted on a lever which is actuated by a solenoid so that, when the solenoid is energized, the electrode almost instantaneously assumes the speed of the periphery of the roll. Similarly, when the solenoid is de-energized, the friction of the rod in a guide and contact tube, promptly stops its feeding motion. Because of the springback that would normally occur when the roll is released, a pawl-like clutch is provided to prevent the rod from retracting when non-engaged by the idler roll.

The smooth-surfaced rolls insure positive disengagement of the electrode (rod or wire), thus eliminating any overdrive when the idler roll moves away from the electrode. Such smooth surfaces also avoid the formation and subsequent accumulation of chips and bits of metal in the electrode guide tube, which have been a source of trouble in the past by interfering with the electrode feed.

Figure 1:
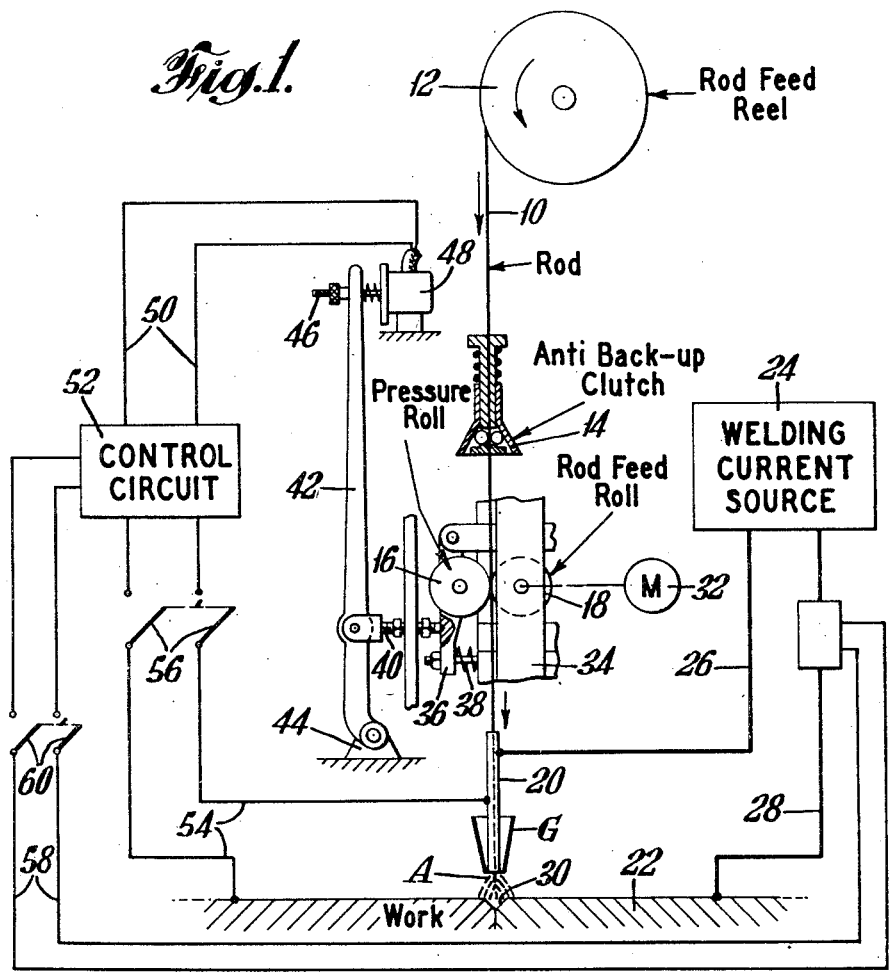
Fig. 1 is a diagram illustrating the invention.

As shown in Fig. 1 electrode 10 in the form of a wire or rod, supplied by a reel 12, passes through an anti-backup clutch 14, then between smooth-surfaced feed and pressure rolls 16 and 18, respectively, and finally through a guide-contact tube 20, on the way toward the work 22 that is to be arc welded. A suitable welding current source 24 is connected by suitable leads or cables 26 and 28 to the tube 20 and work 22, respectively, so that a welding arc A is formed between the lower end or tip of the electrode 10 and a seam 30 in the work as the electrode is fed thereto.

The feed or drive roll 18 is mounted on a fixed support 34 and is driven by an adjustable speed motor 32 at a preselected constant speed which is set somewhat higher than that necessary to supply the arc with rod metal. The pressure roll 16 is mounted to idle, on a pivoted arm 36 that is urged by a spring 38 so that the roll 16 is normally moved away from the electrode. Such action is opposed by a pin 40 that is operated by a lever 42 the one end of which is pivoted to a base 44, the other end of the lever being adjustably connected to the armature 46 of a solenoid 48. The solenoid is connected by leads 50 to a control circuit 52 which, in turn, is connected to an arc voltage pick-up circuit 54 through a switch 56; and to an arc current pick-up (responsive) circuit 58 through a switch 60. Either one or both of the switches may be closed depending upon whether constant current, or constant potential, or constant arc length is desired.

In a constant current control system, as pointed out above, the current is determined by the electrical properties of the source. The open circuit voltage is always much higher than the voltage during welding. The arc voltage is determined by the arc length. In the constant potential system which is described in my Patents #2,043,960, #2,532,410 and #2,532,411, the open circuit voltage is substantially equal to the welding voltage, the current being determined by the rate of electrode feed into the arc zone or area. A third system maintains a constant arc length for any value of current. In describing my invention below, each system is treated separately.

Figure 2:
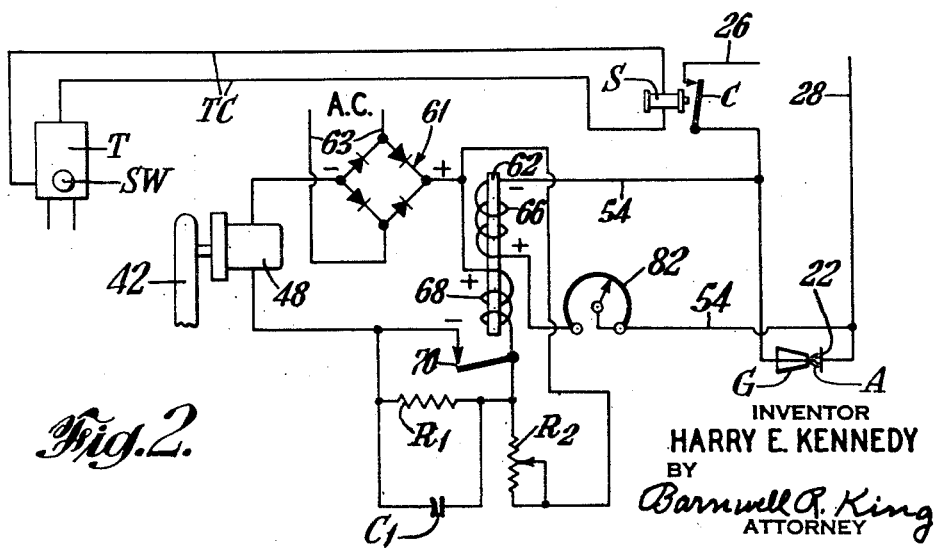
Fig. 2 is a circuit diagram of a constant current system (voltage control)

Since the constant current system is most commonly used, I will describe it first. As pointed out above the feed roll 18 driven at proper speed, engages the consumable electrode 10 by the application of force to the pressure roll 16. Such force applied to the pressure roll 16 is developed by the action of the solenoid 48 energized from a suitable direct current source 61, Fig. 2, such as a full wave rectifier connected by leads 63, 63 to a suitable source of alternating current. Interposed between the solenoid 48 and the source is a voltage relay 62. The voltage relay has two coils 66 and 68. One coil 66 is connected across the arc, by circuit 54 (with switch 56, Fig. 1, closed) and the second coil 68 is connected in series with the solenoid 48 and source 61 through normally open relay contacts 70. When the welding voltage rises the armature of the relay 62 is attracted by the increased magnetic field and so closes contacts 70, applying D. C. voltage to the solenoid 48. But in so doing, the second winding 68 which opposes and tends to thwart the action of the first winding causes the armature to retreat and open the contacts 70. There is, therefore, a constant vibrating action of the relay contacts 70 and a corresponding pressure variation on the feed roll 18. The incremental movement of the electrode 10 is so rapid that it appears to be continuous. When the arc becomes long and therefore the voltage increases, full force is applied with the pressure roll 16, the electrode 10 is almost instantaneously accelerated, and normal conditions restored. Conversely, the feed may be instantaneously disengaged so that no overrun occurs. This, then, describes the action on the constant current system.

In the case of such system, spot or plug welding is accomplished by connecting a welding contactor C in the welding arc circuit 26, 28, that is operated by a coil S. The latter is energized by a timer T connected to the coil S by a circuit TC. The timer operation is initiated by a switch SW that is mounted on the arc welding torch G. In operation, the torch G is held over the work area to be welded, switch SW is operated; arc shielding gas, in case of sigma welding, is supplied to the torch and flows around the end of the electrode and such work area. Contactor C closes, applying open circuit voltage to circuit 54, energizing relay 62, closing contacts 70, energizing solenoid 48, which results in the feeding of the electrode toward the work as described above. When the electrode end touches the work such voltage drops, deenergizing relay 62, opening contacts 70, deenergizing solenoid 48, stopping the electrode feed. The arc A is established and the electrode continues to be fed automatically by the system until the end of the predetermined time set by the timer T, opening the contactor C, and setting the system up for the next cycle.

Figure 3:
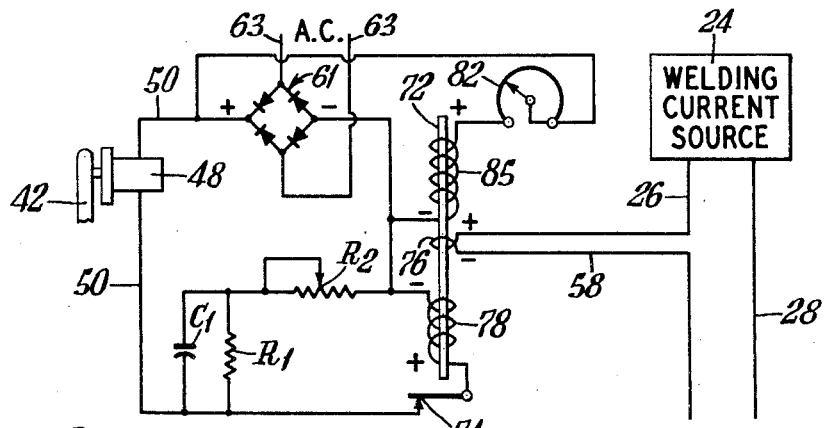
Fig. 3 is a circuit diagram of a constant voltage system (current control)

When welding is being done on a constant potential circuit, Fig. 3, the source 24 maintains a constant voltage at the arc. It, therefore, becomes necessary to regulate the rod feed so that the current will remain fixed for any condition. In order to accomplish this I provide a current relay 72 with contacts 74 that are normally closed. The welding current or a fraction of it energizes a first relay coil 76 through circuit 58 by closure of switch 60, Fig. 1. A second coil 78 energized from a suitable source 61 aids this action. When the relay contacts 74 open, this coil 78 is deenergized and its field collapses. This gives rise to a constant vibration of the relay contacts 74 exactly as described for the potential relay. The current is thus regulated at any predetermined value and will maintain that value regardless of rapid hand motions or irregular welding surfaces.

If it is desired to change the current, say from 200 to 300 amperes, Fig. 3, it would be necessary to have some means of adjusting this circuit. This can be accomplished by either changing the adjustment on the spring of the relay or providing a large rheostat in series with the current coil, which is not practical, or supplying a third coil 85 so that the sum of the current flowing through such third coil and the current flowing through the series coil 78 would oppose the fixed potential coil 78.

Figure 4:
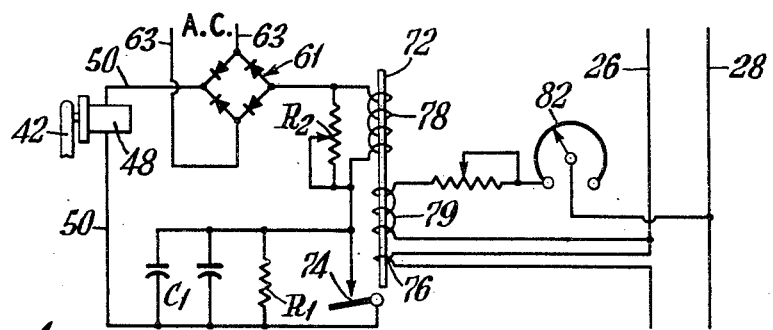
Fig. 4 is a circuit diagram of a constant arc length system (current and voltage control), which is a modification of Fig. 2.

In the third system namely, constant arc length, Fig. 4, a tertiary coil 79 is energized from the welding potential which is constant, but opposes the other two coils 76 and 78. If the arc voltage is increased, additional current must flow in the welding circuit 26, 28 to open the contacts 74; therefore, a new value of current will result corresponding to the raised voltage. Assuming that the welding source voltage (constant) were set for say, 25 volts, and the current 200 amperes, if the voltage (constant) were raised to 30 volts, the current would automatically go up, effecting a constant arc length.

An adjustable resistance 82 is provided in at least one of the control coil circuits. This provides the necessary adjustment for current. Spring tension on the armature of the relay is of course included in this observation. It is further evident that a rectifier will be necessary in the potential coil of the relay when the arc is energized with alternating current.

The sensitivity of the relay can be made very high, say a quarter of a volt. The response is so rapid that I have not found it needful to include a retract starter, because the instant the electrode makes contact with the work, the voltage drops to zero, the electrode stops, and since there is no overrun of the electrode, the arc is initiated without danger of sticking.

This characteristic makes this type of control and wire feeder ideally suitable for spot welding. The control as described plus the addition of an adjustable timer for "measuring" the amount of wire deposited, provides a simple spot welding control.

Figure 5:
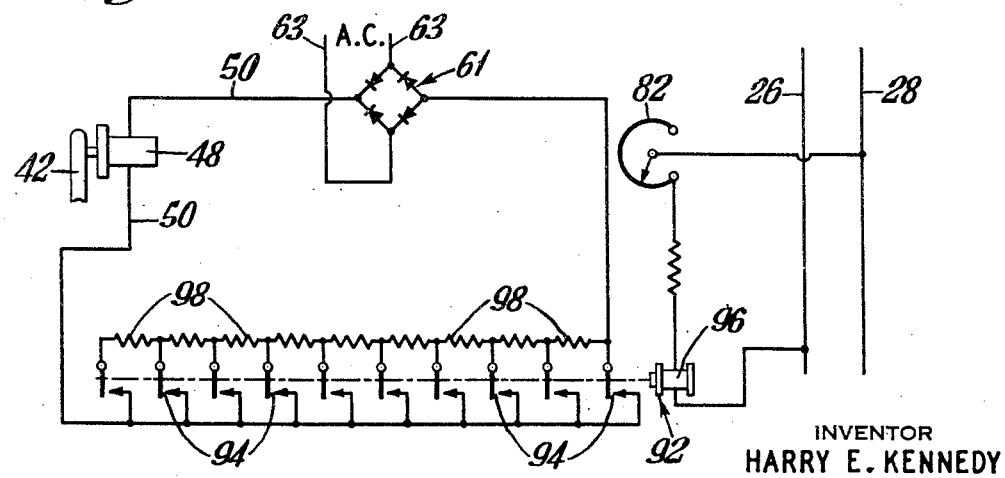
Fig. 5 is a circuit diagram of a modification comprising a voltage sensitive sequential multi-contact relay which automatically regulates the electrode-feed roll pressure to suit the electrode requirements.

It is desirable to main just sufficient feed-roll pressure on the electrode to insure its delivery. Soft wire such as aluminum is easily deformed but because of its relative softness requires little feed-roll pressure. Such little feed-roll pressure may be obtained, for example, by using voltage sensitive relay means 92, Fig. 5, containing a plurality of contacts 94, that close automatically in a predetermined sequence when coil 96 is energized. It is arranged so as to vary the current in the solenoid 48 and hence the feed-roll pressure is automatically regulated to suit the feed requirement of the electrode. For example, assuming that lines 26 and 28 are energized from a suitable source of welding current, and the desired welding voltage is preset by adjusting the rheostat 82, contacts 94 close in sequence until sufficient resistor elements 98 are shunted from circuit 50 to cause the solenoid 48 to be energized, feeding the electrode toward the work. When an arc is established between the electrode and the work, the system automatically regulates the electrode feed to maintain the preset arc voltage by regulating the roll-feed pressure as set forth above.

The use of a contact shunting resistor $R_1$ and condenser $C_1$ provide means for dissipating the stored energy in the solenoid 48 and reducing contact arcing. The effect of the shunting resistors $R_1$ and slotting produced a highly responsive magnetic circuit. Resistor $R_2$ provides means for varying the amount of feed back or current on the bucking coil.

My control can be used for welding under the following conditions: (1) for either A. C. or D. C. welding; (2) voltage control for constant current; (3) current control for constant potential machines; (4) constant arc length control for any setting of current or voltage.

Furthermore it adjusts itself in accordance with the properties of the wire.

The invention reduces the required mechanism for feeding consumable rod to basic components. It can be used for mechanized or manual welding; and for either shielded, inert gas, metallic arc or submerged-arc welding. Besides being fast in response, my control has the advantage of extreme simplicity and an amazing degree of flexibility, suitable for almost any type of work involving an arc.

I claim:

1. An arc electrode feed control comprising the combination of an electrode feed motor, an electrode feed roll driven by said motor at a preselected speed which is substantially constant, an idler roll for pressing a fusible electrode into electrode feeding engagement with said feed roll, means including a lever supporting said idler roll adjacent such electrode in opposition to said feed roll for movement toward and away from such electrode, means associated with said lever means urging said idler roll away from such electrode, a solenoid comprising an armature connected to said lever means for moving said idler roll toward said feed roll for pressing such electrode between said rolls, electrical control means comprising a vibratory type relay, an input circuit and an output circuit, said relay comprising contacts and differentially wound coils, said output circuit comprising a source of power, said relay contacts, one of said coils and said solenoid, and said input circuit comprising another one of said relay coils and a source of power that is responsive to a desired characteristic of an arc formed at the end of such fusible electrode, so that any tendency for such characteristic to change causes said coils to vibrate said contacts at a frequency such that the power supplied to said solenoid is effective to move the armature thereof so as to operate said lever means to cause said idler roll to change the force with which such electrode is pressed against said feed roll in a direction such that the speed at which said electrode is fed toward the arc by said feed roll is changed to correct such tendency, thereby automatically maintaining such characteristic substantially constant.

2. An arc electrode feed control as defined by claim 1, in which the arc is energized by a source of current having a drooping volt-ampere characteristic, and the power for said input circuit is responsive to the arc voltage.

3. An arc electrode feed control as defined by claim 1, in which the arc is energized by a source of current having a flat volt-ampere characteristic, and the power for said input circuit is responsive to the arc current.

4. An arc electrode feed control as defined by claim 1, in which the relay is provided with a third coil connected in series with the arc and the input circuit coil of said relay being connected across said arc, whereby such system is responsive to the length of such arc which is thereby kept constant.

References Cited in the file of this patent

UNITED STATES PATENTS

| | | |
|---|---|---|
| 1,278,983 | Morton | Sept. 17, 1918 |
| 2,043,960 | Jones | June 9, 1936 |
| 2,160,480 | LeTourneau et al. | May 30, 1939 |
| 2,532,410 | Kennedy | Dec. 5, 1950 |
| 2,532,411 | Kennedy | Dec. 5, 1950 |